United States Patent
Nagaoka et al.

(10) Patent No.: US 8,227,063 B2
(45) Date of Patent: Jul. 24, 2012

(54) INK-CONTACTING THERMOPLASTIC ELASTOMER COMPOSITION FOR INK JET PRINTER

(75) Inventors: Kyosuke Nagaoka, Tokyo (JP); Akihiko Shimomura, Yokohama (JP); Toshihiko Ujita, Yokohama (JP); Takashi Fukushima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 12/763,044

(22) Filed: Apr. 19, 2010

(65) Prior Publication Data

US 2010/0305272 A1 Dec. 2, 2010

(30) Foreign Application Priority Data

Jun. 1, 2009 (JP) .................. 2009-132121

(51) Int. Cl.
C08L 23/06 (2006.01)
C08L 23/22 (2006.01)
C08L 53/02 (2006.01)

(52) U.S. Cl. ........................ 428/36.9; 525/89

(58) Field of Classification Search ............. 525/89; 428/36.9
See application file for complete search history.

(56) References Cited

U.S. PATENT DOCUMENTS

| | | | |
|---|---|---|---|
| 4,689,640 A | 8/1987 | Shimomura | |
| 5,381,172 A | 1/1995 | Ujita et al. | |
| 5,451,992 A | 9/1995 | Shimomura et al. | |
| 5,510,818 A | 4/1996 | Shimomura et al. | |
| 5,650,805 A | 7/1997 | Shimomura et al. | |
| 5,663,752 A | 9/1997 | Imamura et al. | |
| 5,738,911 A | 4/1998 | Imamura et al. | |
| 5,901,615 A | 5/1999 | Itoh et al. | |
| 5,910,540 A | 6/1999 | Takahashi | |
| 5,980,026 A | 11/1999 | Imamura et al. | |
| 6,130,696 A | 10/2000 | Mashita et al. | |
| 6,409,931 B1 | 6/2002 | Shimomura et al. | |
| 6,484,399 B2 | 11/2002 | Aono et al. | |
| 6,586,495 B1 | 7/2003 | Shimomura et al. | |
| 6,713,128 B2 | 3/2004 | Shimomura et al. | |
| 6,750,290 B2 | 6/2004 | Imamura et al. | |
| 6,846,520 B2 | 1/2005 | Shimomura et al. | |
| 6,869,541 B2 | 3/2005 | Shimomura et al. | |
| 6,981,762 B2 | 1/2006 | Mashita et al. | |
| 7,163,980 B2 | 1/2007 | Mashita et al. | |
| 2008/0211884 A1 | 9/2008 | Saito et al. | |

FOREIGN PATENT DOCUMENTS

| | | |
|---|---|---|
| EP | 1 564 247 A1 | 8/2005 |
| EP | 1 702 951 A1 | 9/2006 |
| JP | 9-300652 A | 11/1997 |
| JP | 11-323059 A | 11/1999 |
| JP | 2003-128870 A | 5/2003 |
| JP | 2005-305878 A | 11/2005 |
| JP | 2007-57067 A | 3/2007 |
| JP | 2007-204676 A | 8/2007 |
| WO | 01/14142 A1 | 3/2001 |
| WO | 03/027183 A1 | 4/2003 |

OTHER PUBLICATIONS

Kishii, electronic translation of specification of JP 2003-128870 (May 2003).*

Search Report dated Oct. 20, 2010 in European Application No. 10004185.4.

* cited by examiner

*Primary Examiner* — Jeffrey Mullis

(74) *Attorney, Agent, or Firm* — Fitzpatrick, Cella, Harper & Scinto

(57) ABSTRACT

The ink-contacting thermoplastic elastomer composition for an ink jet printer of the present invention contains: a styrene-isoprene-styrene block copolymer (SIS) in which at least part of isoprene blocks are formed of 3,4-polyisoprene; a styrene-ethylene/butylene-styrene block copolymer (SEBS); a polyolefin; and a polybutene.

2 Claims, No Drawings

INK-CONTACTING THERMOPLASTIC ELASTOMER COMPOSITION FOR INK JET PRINTER

BACKGROUND OF THE INVENTION

1. Field of the Invention

The present invention relates to an ink-contacting thermoplastic elastomer composition for an ink jet printer, in particular, technology concerning the gas barrier characteristic, water vapor barrier characteristic, flex resistance, and tube moldability of an ink-contacting thermoplastic elastomer composition for an ink jet printer.

2. Description of the Related Art

An ink jet recording apparatus that performs recording on a recording medium by discharging ink from an ink jet recording head has been conventionally known. In the ink jet recording apparatus, the recording is performed by discharging the ink from the ink jet recording head while moving a carriage on which the ink jet recording head is mounted in the main scanning direction with respect to the recording medium. After one main scan, the recording medium is moved in a sub-scanning direction in a certain amount, and the carriage is moved in the main scanning direction again so that the recording may be performed. Repeating the operation enables the completion of the recording of a requested pattern on the recording medium.

The ink supply unit of the ink jet recording apparatus may be of such a type that an exchangeable tank filled with the ink (ink tank) is mounted separately from the carriage. Adopted in the ink jet recording apparatus of the type is a mechanism in which the ink tank and the ink jet recording head mounted on the carriage are connected to each other via an ink supply tube, and the ink is supplied to the ink jet recording head. The type facilitates an increase in volume of the ink tank, and is hence suitable for the purpose of using a relatively large amount of ink.

When recording is performed with the ink jet recording apparatus of such type, the ink supply tube for connecting the ink tank and the ink jet recording head mounted on the carriage is also routed in association with the reciprocation of the carriage on which the recording head is mounted, and hence the flexural rigidity of the ink supply tube is raised. As a result, a fatigue failure may occur when the hardness of the ink supply tube is high. Accordingly, the ink supply tube must have flexibility enough to resist the reciprocation. In particular, a reduction in size of an ink jet printer has been progressing in recent years, and higher flexibility has been requested of the ink supply tube at the time of the recording because reciprocation with a smaller flexing ratio is needed.

In addition, when moisture evaporates from the ink present in the ink supply tube to the outside of the ink supply tube, an increase in viscosity of the ink occurs, and the increase may cause serious problems such as a discharge anomaly and a reduction in print quality due to a change in composition of the ink. Accordingly, a high water vapor barrier characteristic is also requested of the ink supply tube.

Moreover, when an external gas such as air permeates into a tube material in the ink supply tube, the external gas dissolves in the ink in the ink supply tube, and hence a degree of deaeration reduces. Alternatively, a discharge anomaly or a reduction in print quality may be caused by the generation and growth of air bubbles in the ink. Accordingly, a high gas barrier characteristic is also requested of the ink supply tube. The gas barrier characteristic is extremely important particularly in an ink jet recording apparatus using a piezoelectric device because of the following reason. That is, a gas held in the ink supply tube serves as a cushion to prevent energy needed for ink discharge from being conveyed to an ink chamber, and the prevention may preclude the discharge.

Japanese Patent Application Laid-Open No. H09-300652 proposes an ink supply tube for ink jet recording of such a laminated structure that a material having ink resistance, small moisture permeability, and small rigidity is used in each of an inner layer contacting ink and an outer layer contacting external air, and a material having a low gas permeability is used in an intermediate layer. To be specific, a polyethylene is used as a material for each of the inner layer and the outer layer, and an ethylene-vinyl alcohol copolymer or a polyvinylidene chloride is used in the intermediate layer.

In addition, an approach involving using a thermoplastic elastomer having high flexibility in an ink supply tube for ink jet recording has also been investigated. For example, an olefin- or styrene-based elastomer is used as the thermoplastic elastomer. Japanese Patent Application Laid-open No. 2005-305878 proposes an ink supply tube for ink jet recording using a thermoplastic elastomer. To be specific, a styrene-isobutylene-styrene block copolymer (SIBS), a polyolefin, and a liquid polybutene are used, and the resultant ink supply tube for ink jet recording has an excellent gas barrier characteristic, an excellent water vapor barrier characteristic, and good flexibility.

However, such ethylene-vinyl alcohol copolymer or polyvinylidene chloride as described in Japanese Patent Application Laid-Open No. H09-300652 has high rigidity, though the copolymer or the polyvinylidene chloride has a low gas permeability. Accordingly, an ink supply tube using any such material that reciprocates upon recording has involved a problem concerning flexibility in terms of flex resistance. In addition, the case where a polyethylene is used in the outer layer has also involved a problem concerning a request for higher flexibility on the basis of the fact that reciprocation with a smaller flexing ratio has been requested in association with a recent reduction in size of a printer apparatus, though the case is suitable for a large printer application. In addition, the laminated structure ineluctably involves an increase in cost.

On the other hand, a tube using a thermoplastic elastomer is excellent in flexibility as compared to a non-elastomer member. Olefin-based thermoplastic elastomers have been widely used in the fields of automobile parts, industrial parts, and electrical and electronic engineering. Although the elastomers are excellent in water vapor barrier characteristic as well, an ink jet ink supply tube using any such elastomer has involved a problem concerning a gas barrier characteristic. Tubes each using a styrene-ethylene/butylene-styrene block copolymer (SEBS) as a polystyrene-based elastomer are excellent in gas barrier characteristic as compared to the olefin-based thermoplastic elastomers. Although the tubes have already been put into practical use in assorted applications, an additional improvement in gas barrier characteristic is requested of the tubes so that the tubes may be used for ink supply. Such tube using a styrene-isobutylene-styrene block copolymer (SIBS) as described in Japanese Patent Application Laid-open No. 2005-305878 involves a problem concerning moldability, though the tube is excellent in water vapor barrier characteristic and gas barrier characteristic. In addition, the use of the styrene-isobutylene-styrene block copolymer (SIBS) as a material involves a problem, i.e., an increase in cost.

SUMMARY OF THE INVENTION

In view of the foregoing, an object of the present invention is to provide an ink supply tube excellent in gas barrier characteristic, water vapor barrier characteristic, flex resistance, and tube moldability. Another object of the present invention is to produce the tube at a low cost.

In the present invention, the objects were achieved by blending a thermoplastic elastomer containing a specific block copolymer with a lubricating agent and a softening agent having specific components.

First, a styrene-isoprene-styrene block copolymer (SIS) (especially a polymer material containing 3,4-polyisoprene) having high barrier characteristics but involving a problem concerning moldability was used. Then, a styrene-ethylene/butylene-styrene block copolymer (SEBS) excellent in moldability as a tube material was alloyed with the SIS. Further, an investigation was conducted on the blending of a lubricating agent and a softening agent to enable tube molding. Then, a polybutene excellent in water vapor barrier characteristic and gas barrier characteristic was selected as the softening agent, and a polyolefin having a good ink-contacting characteristic and excellent in gas barrier characteristic was selected as the lubricating agent. Thus, such performance that the resultant was available as an ink-contacting thermoplastic elastomer composition for an ink jet printer was achieved.

That is, the present invention is an ink-contacting thermoplastic elastomer composition for an ink jet printer, including: a styrene-isoprene-styrene block copolymer (SIS) in which at least part of isoprene blocks are formed of 3,4-polyisoprene; a styrene-ethylene/butylene-styrene block copolymer (SEBS); a polyolefin; and a polybutene.

According to the present invention, there can be provided an ink-contacting thermoplastic elastomer composition for an ink jet printer excellent in gas barrier characteristic, water vapor barrier characteristic, flex resistance, and tube moldability. In addition, the present invention is also characterized in that a cost can be reduced.

Further features of the present invention will become apparent from the following description of exemplary embodiments.

DESCRIPTION OF THE EMBODIMENTS

An ink-contacting thermoplastic elastomer composition for an ink jet printer (hereinafter simply referred to as "thermoplastic elastomer composition") of the present invention contains polystyrene-based thermoplastic elastomers. The polystyrene-based thermoplastic elastomers each have an aromatic vinyl-based polymer as a hard segment and a rubber component as a soft segment. Then, the hard segment inhibits plastic deformation like a crosslinking point of vulcanized rubber, and the soft segment is soft and shows such property as to undergo plastic deformation. Thus, the elastomers each show the same rubber elasticity as that of the vulcanized rubber.

In the present invention, a styrene-isoprene-styrene block copolymer (SIS) in which at least part of the isoprene blocks are formed of 3,4-polyisoprene is used as one of the polystyrene-based thermoplastic elastomers. That is, the copolymer is characterized by containing not only 1,4-polyisoprene that is often used in general but also 3,4-polyisoprene as the soft segment. Because the main chain of 3,4-polyisoprene is a saturated bond, 3,4-polyisoprene shows excellent properties as compared to 1,4-polyisoprene in terms of, for example, a mechanical strength, flexibility, gas permeation resistance, and deterioration resistance, and is excellent particularly in properties requested of a tube material, i.e., water vapor barrier characteristic and gas barrier characteristic.

Although the content of 3,4-polyisoprene in the isoprene blocks is not particularly limited, 3,4-polyisoprene accounts for preferably 20 to 100 mass %, or more preferably 50 to 100 mass % of the isoprene blocks. The content of the styrene blocks in the styrene-isoprene-styrene block copolymer (SIS) is preferably 10 to 50 mass %, or more preferably 15 to 40 mass %. Although the weight-average molecular weight of the styrene-isoprene-styrene block copolymer (SIS) is not particularly limited, the weight-average molecular weight preferably falls within the range of 40,000 to 100,000 in terms of, for example, moldability.

It should be noted that the content of the styrene-isoprene-styrene block copolymer (SIS) is preferably about 20 to 40 parts by mass with respect to 100 parts by mass of the ink-contacting thermoplastic elastomer composition.

In the present invention, a styrene-ethylene/butylene-styrene block copolymer (SEBS) as well as the styrene-isoprene-styrene block copolymer (SIS) is used as another one of the polystyrene-based thermoplastic elastomers. Alloying the styrene-ethylene/butylene-styrene block copolymer (SEBS) with the styrene-isoprene-styrene block copolymer (SIS) can impart moldability enough for the SEBS to serve as a material for an ink supply tube.

The content of the styrene blocks in the styrene-ethylene/butylene-styrene block copolymer (SEBS) is preferably 10 to 50 mass %, or more preferably 15 to 40 mass %. Although the weight-average molecular weight of the styrene-ethylene/butylene-styrene block copolymer (SEBS) is not particularly limited, the weight-average molecular weight preferably falls within the range of 40,000 to 120,000 in terms of, for example, moldability.

It should be noted that the content of the styrene-ethylene/butylene-styrene block copolymer (SEBS) is preferably about 20 to 30 parts by mass with respect to 100 parts by mass of the thermoplastic elastomer composition.

In addition, a blending mass ratio between the SIS and the SEBS (SIS/SEBS) is preferably 20/80 to 80/20, or more preferably 50/50 to 70/30 from the viewpoints of, for example, a gas barrier characteristic and moldability.

The thermoplastic elastomer composition of the present invention may contain a polystyrene-based thermoplastic elastomer except the above copolymers.

The content of the polystyrene-based thermoplastic elastomers in the thermoplastic elastomer composition of the present invention is preferably 10 to 98 parts by mass, or more preferably 40 to 85 parts by mass with respect to 100 parts by mass of the thermoplastic elastomer composition from the viewpoints of flex resistance and barrier characteristics.

The thermoplastic elastomer composition of the present invention further contains a polyolefin. The polyolefin resin is used from the viewpoint of an improvement in processability of the thermoplastic elastomer composition. A polyethylene polymer such as a high-density polyethylene (HDPE), a low-density polyethylene (LDPE), or a linear, low-density polyethylene (LLDPE), or a polypropylene polymer can be used as the polyolefin, and the polyolefin is not particularly limited to the foregoing. Of those, the high-density polyethylene (HDPE) is preferable in terms of the gas barrier characteristic of a material for an ink supply tube. One kind of polyolefins may be used alone, or two or more kinds of them may be used in combination.

The content of the polyolefin in the thermoplastic elastomer composition of the present invention is preferably 1 to 50 parts by mass, or more preferably 10 to 30 parts by mass with respect to 100 parts by mass of the thermoplastic elastomer composition from the viewpoints of moldability and flexibility.

The thermoplastic elastomer composition of the present invention further contains a polybutene. Blending the polybutene can improve not only the flexibility of the thermoplastic elastomer composition but also the water vapor barrier characteristic and gas barrier characteristic of the composition. For example, an isobutene homopolymer as a polymer obtained by polymerizing isobutene, which is obtained by using a C4 fraction as a result of petroleum refining as a raw material, as a main monomer, or a copolymer of isobutene and n-butene can be used as the polybutene.

The number-average molecular weight of the polybutene preferably falls within the range of 300 to 10,000 in terms of an improvement in flexibility of the thermoplastic elastomer composition.

The content of the polybutene in the thermoplastic elastomer composition of the present invention is preferably 1 to 40 parts by mass, more preferably 5 to 30 parts by mass, or still more preferably 20 to 30 parts by mass with respect to 100 parts by mass of the thermoplastic elastomer composition from the viewpoints of barrier characteristics and flexibility.

The thermoplastic elastomer composition of the present invention can be blended with various components in addition to the above components as required to such an extent that an effect of the present invention is not impaired. Any one of the various additives such as a flame retardant, a lubricating agent, a surfactant, a foaming agent, an antioxidant, an age resistor, and an adhesiveness-imparting agent can be appropriately blended.

A method of producing the composition of the present invention is not particularly limited, and any one of the known methods can be applied. An enclosed kneading apparatus such as a LABOPLASTOMILL, a Brabender, a Banbury Mixer, a kneader, or a roll, or a continuous melt-kneading apparatus such as a batch type kneading apparatus, a uniaxial extruder, or a biaxial extruder can be used as the melt-kneading apparatus.

The thermoplastic elastomer composition of the present invention thus obtained can be molded by using a molding method and a molding apparatus generally used for a thermoplastic resin composition. The thermoplastic elastomer composition of the present invention can be melted and molded by, for example, extrusion molding, injection molding, press molding, or blow molding.

The thermoplastic elastomer composition of the present invention preferably has the following characteristics: (1) a rubber hardness (JIS K6253 type A) of 30 or more and 80 or less; (2) a moisture permeability (JIS Z0208 (cup method)) of 2.0 g/m²·24 h or less with reference to a sheet having a thickness of 0.5 mm; and (3) an air permeability (JIS K7126 (differential pressure method)) of $2.5 \times 10^{-10}$ cm³·cm/cm²·s·cmHg or less with reference to a sheet having a thickness of 0.5 mm.

The thermoplastic elastomer composition of the present invention, which is suitable as a material for an ink supply tube for an ink jet printer or a sealing member, can find use in assorted applications where contact with a liquid such as ink occurs such as a flexible container in which ink is sealed.

Hereinafter, the ink-contacting thermoplastic elastomer composition for an ink jet printer of the present invention is specifically described in detail. However, the technical scope of the present invention is not limited to the following.

EXAMPLES 1 TO 6 AND COMPARATIVE EXAMPLES 1 to 5

Thermoplastic elastomer compositions each having composition shown in Table 1 were prepared. Then, a test piece for evaluation was produced by using each of the thermoplastic elastomer compositions, and was evaluated for the following items (1) to (5). Table 1 shows the results.

TABLE 1

|  |  | Example | | | | | | Comparative Example | | | | |
| --- | --- | --- | --- | --- | --- | --- | --- | --- | --- | --- | --- | --- |
|  |  | 1 | 2 | 3 | 4 | 5 | 6 | 1 | 2 | 3 | 4 | 5 |
| Composition | SIS (containing 3,4-polyisoprene) | 25 | 25 | 40 | 40 | 20 | 20 |  | 50 |  |  |  |
|  | SIS (free of 3,4-polyisoprene) |  |  |  |  |  |  |  |  |  | 25 |  |
|  | SEBS | 25 | 25 | 20 | 20 | 20 | 30 |  |  |  | 50 | 25 |
|  | SIBS |  |  |  |  |  |  | 40 |  |  |  |  |
|  | EVOH |  |  |  |  |  |  |  |  |  |  | 20 |
|  | PP | 25 |  |  |  |  |  | 40 | 25 | 25 | 25 |  |
|  | PE |  |  |  |  |  |  |  |  |  |  | 80 |
|  | HDPE |  | 25 | 20 | 10 | 30 | 30 |  |  |  |  |  |
|  | Polybutene | 25 | 25 | 20 | 30 | 30 | 20 | 20 |  |  |  |  |
|  | Paraffin |  |  |  |  |  |  |  |  | 25 | 25 | 25 |
| Results of evaluation | Hardness (JIS K6253 type A) | 73 | 73 | 70 | 63 | 77 | 75 | 72 | — | 75 | 71 | 100 |
|  | Moisture permeability (JIS Z0208 (cup method)) (g/m² · 24 h) | 1.8 | 1.8 | 1.6 | 1.9 | 1.8 | 1.8 | 1.9 | — | 4.5 | 4.5 | 2.1 |
|  | Air permeability (JIS K7126 (differential pressure method)) ($10^{-10}$ cm³ · cm/cm² · s · cmHg) | 2.2 | 1.7 | 1.6 | 2.0 | 1.7 | 2.0 | 1.6 | — | 8.0 | 6.0 | 0.5 |
|  | Moldability | A | A | A | A | A | A | B | C | A | A | A |
|  | Flex resistance | A | A | A | A | A | A | A | — | A | A | C |

*Units of the "composition" refer to parts by mass (Material Used)

SIS (Containing 3,4-polyisoprene):
Styrene-isoprene-styrene block copolymer (manufactured by KURARAY CO., LTD., trade name: HYBRAR 5125, content of styrene blocks: 20 mass %

SIS (Free of 3,4-polyisoprene):
Styrene-isoprene-styrene block copolymer (manufactured by JSR Corporation, trade name: SIS 5002, content of 3,4-polyisoprene in isoprene block: 0 mass %, content of styrene blocks: 22 mass %)

SEBS:
Styrene-ethylene/butylene-styrene block copolymer (manufactured by KURARAY CO., LTD., trade name: SEPTON 8007, content of styrene blocks: 30 mass %)

SIBS:
Styrene-isobutylene-styrene block copolymer (manufactured by Kaneka Corporation, trade name: SIBSTAR 073T)

EVOH:

Ethylene-vinyl alcohol copolymer (manufactured by KURARAY CO., LTD., trade name: EVAL F101B)

PP:

Polypropylene (manufactured by Japan Polypropylene Corporation, trade name: NOVATEC PP EA7A)

PE:

Polyethylene (manufactured by Prime Polymer Co., Ltd., trade name: NEO-ZEX 2015M)

HDPE:

High-density polyethylene (manufactured by Prime Polymer Co., Ltd, trade name: HI-ZEX 5000SF)

Polybutene:

(Manufactured by NIPPON OIL CORPORATION, trade name: HV-300, number-average molecular weight: 1400)

Paraffin:

(Manufactured by Idemitsu Kosan Co., Ltd., trade name: Diana Process Oil PW 150)

(Evaluation)

(1) Rubber Hardness

A sheet having a thickness of 10.0 mm was produced, and measurement was performed with a type A durometer in conformity with the regulations of JIS K6253.

(2) Moisture Permeability

A sheet having a thickness of 0.5 mm was produced, and measurement was performed in conformity with the regulations of JIS 20208.

(3) Air Permeability

A sheet having a thickness of 0.5 mm was produced, and measurement was performed in conformity with the regulations of JIS K7126.

(4) Moldability

The moldability of an ink supply tube was evaluated by the average surface roughness (Ra) under a condition of a constant extrusion rate. There is the correlation between the extrusion rate and the average surface roughness of the ink supply tube and the average surface roughness increases as the extrusion rate increases. To maintain the quality of the ink supply tube, it is preferable that the average surface roughness is 10 µm or less. The extrusion rate capable of molding under this condition is so great that the moldability of the material is excellent.

The average surface roughness (Ra) is measured by 5-line confocal microscope 5130 manufactured by Lasertec, which has an objective lens of a magnification of 20 and z resolution of 0.2 µm.

To be specific, a thermoplastic elastomer material was melted and kneaded with a batch type kneading apparatus. Then, an ink supply tube of such a size as to have a tube inner diameter of 1.0 mm and a tube outer diameter of 3.0 mm was molded with an extrusion molding apparatus with an extrusion rate of 1.5 m·min$^{-1}$, and was then evaluated on the basis of the following criteria.

A: The average surface roughness (Ra) is less than 3 µm.

B: The average surface roughness (Ra) of 3 µm or more and less than 10 µm.

C: The average surface roughness (Ra) of 10 µm or more and not moldable by extrusion.

(5) Flex Resistance

An ink supply tube was evaluated for its flex resistance. To be specific, the ink supply tube was mounted on an ink jet printer (manufactured by Canon Inc., trade name: ip4200), and reciprocation was performed 2,000,000 times in a state where the ink supply tube was curved at a flexing radius of 35 mm.

A: No fatigue failure occurred owing to the reciprocation.

C: A fatigue failure occurred owing to the reciprocation.

(Results of Evaluation)

In each of the thermoplastic elastomer compositions of Examples 1 to 6, each of the characteristics, i.e., the rubber hardness, the moisture permeability, the air permeability, the moldability, and the flex resistance was at a high level. In contrast, in each of the thermoplastic elastomer compositions of Comparative Examples 1 to 5, at least one of the characteristics was defective. It should be noted that the thermoplastic elastomer composition of Comparative Example 2 was not evaluated for its rubber hardness, moisture permeability, air permeability, and flex resistance because the composition had high adhesiveness and it was difficult to mold the thermoplastic elastomer composition.

In other words, in each of Examples 1 to 6, the SIS (containing 3,4-polyisoprene) having high barrier characteristics, the SEBS excellent in moldability, the polybutene excellent in water vapor barrier characteristic and gas barrier characteristic, and the polyolefin having a good ink-contacting characteristic and excellent in gas barrier characteristic were combined. The combination allowed achieving such performance that the composition was available in an ink jet application, and securing an ability to resist 2,000,000 or more times of reciprocation even in the flex resistance test based on reciprocation in a state where the ink supply tube was curved at a flexing radius of 35 mm assuming an actual use environment. The use of the high-density polyethylene (HDPE) instead of the polypropylene (PP) as a polyolefin additionally reduced the air permeability and improved the gas barrier characteristic (Examples 2 to 6).

On the other hand, when only the SIS (containing 3,4-polyisoprene) was used as a styrene-based thermoplastic elastomer, it was difficult to mold a thermoplastic elastomer composition (Comparative Example 2). When only the SEBS was used as a styrene-based thermoplastic elastomer, no problem arose in terms of moldability, but neither the water vapor barrier characteristic nor the gas barrier characteristic reached a sufficient level (Comparative Example 3). When the SIS (free of 3,4-polyisoprene) was used instead of the SIS (containing 3,4-polyisoprene), the water vapor barrier characteristic and the gas barrier characteristic reduced owing to the presence of a large number of double bonds in the main chain (Comparative Example 4). In such composition that the thermoplastic elastomer composition had a rubber hardness of 80 or more, a fatigue failure occurred, and the composition could not show sufficient flex resistance (Comparative Example 5).

Thus, according to the present invention, there can be provided an ink-contacting thermoplastic elastomer composition for an ink jet printer excellent in gas barrier characteristic, water vapor barrier characteristic, flex resistance, and tube moldability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-132121, filed Jun. 1, 2009, which is hereby incorporated by reference herein in its entirety.

What is claimed is:

1. A tube for ink supply of an ink jet printer, comprising:
 a styrene-isoprene-styrene block copolymer (SIS) in which at least part of isoprene blocks are formed of 3,4-polyisoprene;
 a styrene-ethylene/butylene-styrene block copolymer (SEBS);

a polyethylene; and a polybutene having a number-average molecular weight of 300 to 10,000, a content of the polybutene being not more than 30 parts by mass with respect to a resin composition constituting the tube.

2. A tube for ink supply of an ink jet printer according to claim 1, wherein:

a rubber hardness (JIS K6253 type A) is 30 or more and 80 or less;

a moisture permeability (JIS Z0208 (cup method)) is 2.0 g/m$^2$·24 h or less with reference to a sheet having a thickness of 0.5 mm; and an air permeability (JIS K7126 (differential pressure method)) is $2.5 \times 10^{-10}$ cm$^3$·cm/cm$^2$·s·cmHg or less with reference to a sheet having a thickness of 0.5 mm.

* * * * *